Figure 3:
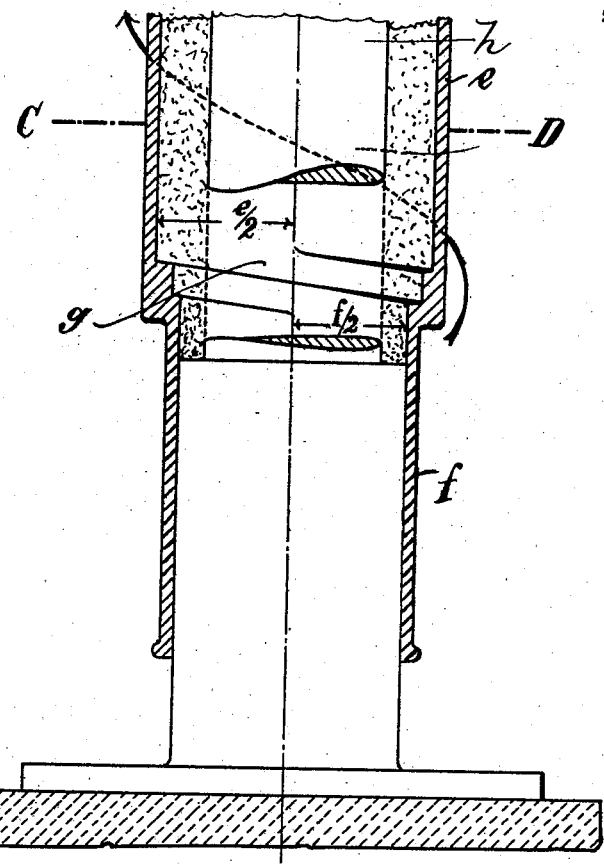

No. 745,291. PATENTED NOV. 24, 1903.
B. NÖLDNER.
APPARATUS FOR MANUFACTURING CEMENT PIPES OR THE LIKE.
APPLICATION FILED OCT. 24, 1902.
NO MODEL. 2 SHEETS—SHEET 1.
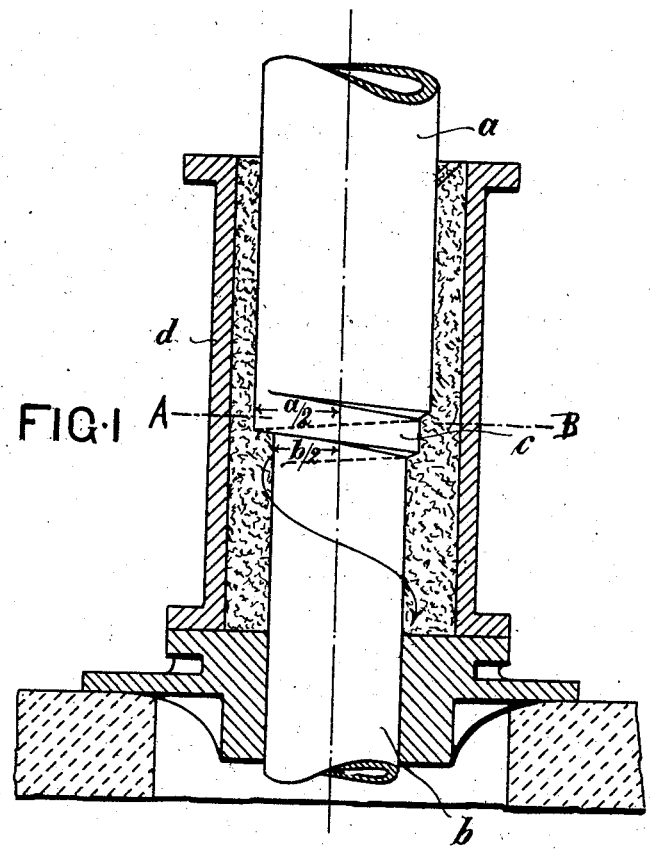
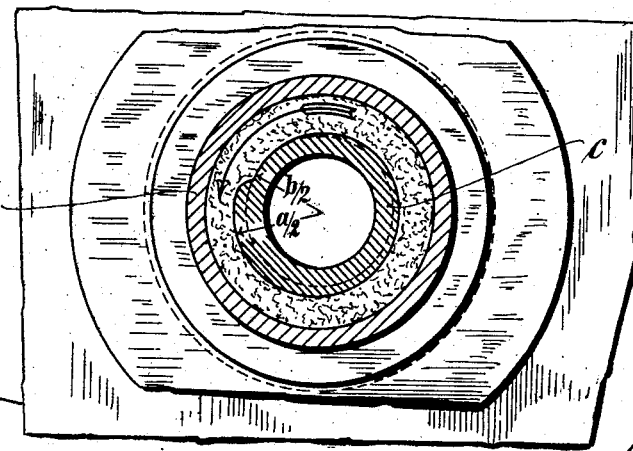

No. 745,291. PATENTED NOV. 24, 1903.
B. NÖLDNER.
APPARATUS FOR MANUFACTURING CEMENT PIPES OR THE LIKE.
APPLICATION FILED OCT. 24, 1902.
NO MODEL. 2 SHEETS—SHEET 2.

Witnesses.
Albert Jones
Samuel Percival

Inventor
Bruno Nöldner
By his Attorneys.
Wheatley & Mackenzie

No. 745,291. Patented November 24, 1903.

UNITED STATES PATENT OFFICE.

BRUNO NÖLDNER, OF BRESLAU, GERMANY, ASSIGNOR OF ONE-HALF TO MAX KOHL, OF BRESLAU, GERMANY.

APPARATUS FOR MANUFACTURING CEMENT PIPES OR THE LIKE.

SPECIFICATION forming part of Letters Patent No. 745,291, dated November 24, 1903.

Application filed October 24, 1902. Serial No. 128,597. (No model.)

*To all whom it may concern:*

Be it known that I, BRUNO NÖLDNER, a subject of the Emperor of Germany, residing at 18 Ohlauerstrasse, Breslau, Germany, have invented certain new and useful Improvements in Apparatus for Manufacturing Cement Pipes or the Like; and I do hereby declare the following to be a full, clear, and exact description of the invention, such as will enable others skilled in the art to which it appertains to make and use the same.

This invention relates to an apparatus for manufacturing cement pipes and the like in which when the core or casing is rotated side pressure is applied to the material to be pressed.

Hollow molds with double sides for making cement pipes are already known in which pressure is applied laterally to the material by means of the radial displacement of the hollow core, which consists of several parts. The pressure applied to the material by means of the radial displacement of the core is, however, uniform at all points of the circumference of the core, and consequently it is not possible to effect uniform compression of the material unevenly distributed between the core and the casing, the material remaining unequally distributed after the pressing operation, the parts with compact layers receiving the principal part of the pressure, while in places where the layers are less compact only a slight pressure is exercised. This invention is intended to obviate these disadvantages and to insure the material being uniformly distributed between the core and the casing. For this purpose a pressing-piece with curved pressing-surface is arranged on the core or the casing, this curved surface becoming gradually farther from the center of the core. When the core or casing is rotated, the pressing-piece first penetrates into those places in the material which are at the shortest distance from the center of the core and exercises a slight pressure on the layer of the material adjoining the spot where the pressure is exerted, this slight pressure gradually increasing as the pressing-piece continues moving. The material lying in front of the pressing-piece in the direction of the motion is removed when the layer is too compact and is pressed into a layer which is not so compact. Consequently any uneven spaces between the particles of the material are uniformly filled up by the due distribution of the material between the core and the casing, so that when the radial pressure is effected the sides of the pipe are made uniformly compact in all parts.

In the drawings a particular example of the invention is illustrated in which the pressing-piece is made in the form of a screw and the core is moved longitudinally in relation to the casing. The drawings also show a form of construction wherein the casing is rotated.

Figure 1 is a longitudinal section; Fig. 2, a section along the line A B in Fig. 1. Fig. 3 is a vertical sectional view showing a modification, and Fig. 4 is a horizontal section on line C D of Fig. 3.

The core consists of a thick part $a$ and a thin part $b$, between which the pressing-piece $c$ is arranged, the diameter of the pressing-piece gradually increasing from $b^2$ to $a^2$. When the core is rotated, the pressing-piece $c$ gradually enters the material between the core and the casing, the material being compressed to the extent of the difference between $a^2$ and $b^2$ and at the same time uniformly distributed.

Figure 4:
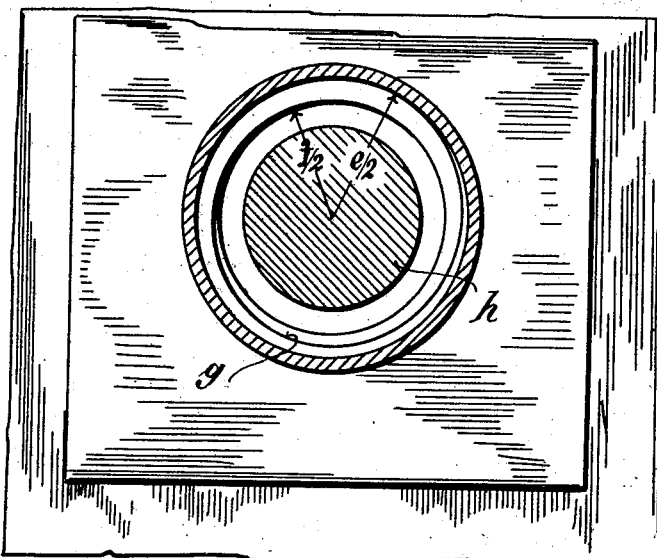

In Figs. 3 and 4 I show a modification of the invention wherein the pressing-piece $g$ is arranged on the casing, which latter consists of a wide part $e$ and a narrow part $f$, between which parts the pressing-piece is arranged, the diameter of this latter gradually diminishing from $e^2$ to $f^2$. $h$ indicates the core. When the casing is rotated, the pressing-piece $g$ moves gradually in the material between the core and the casing, the material being compressed to the extent of the difference between $e^2$ and $f^2$ and uniformly spread.

What I claim, and desire to secure by Letters Patent, is—

1. In an apparatus for manufacturing cement pipes, the combination of an outer casing, an inner core, one of said parts being rotatable, and a pressing-piece having the shape of a conical screw carried by the rotatable part, the said pressing-piece having a curved pressing-surface which has a gradually-varying diameter.

2. In an apparatus for manufacturing cement pipes, the combination of an outer casing, an inner core, and a pressing-piece having the shape of a conical screw and arranged on the core, said pressing-piece having a curved pressing-surface which becomes gradually farther from the center of the core.

In testimony whereof I have affixed my signature in presence of two witnesses.

BRUNO NÖLDNER.

Witnesses:
ERNST KATZ,
ALBERT SCHENK.